No. 770,515. PATENTED SEPT. 20, 1904.
F. S. WILLIAMS.
COMBINED COTTON PLANTER AND FERTILIZER DISTRIBUTER.
APPLICATION FILED FEB. 8, 1904.
NO MODEL. 2 SHEETS—SHEET 1.
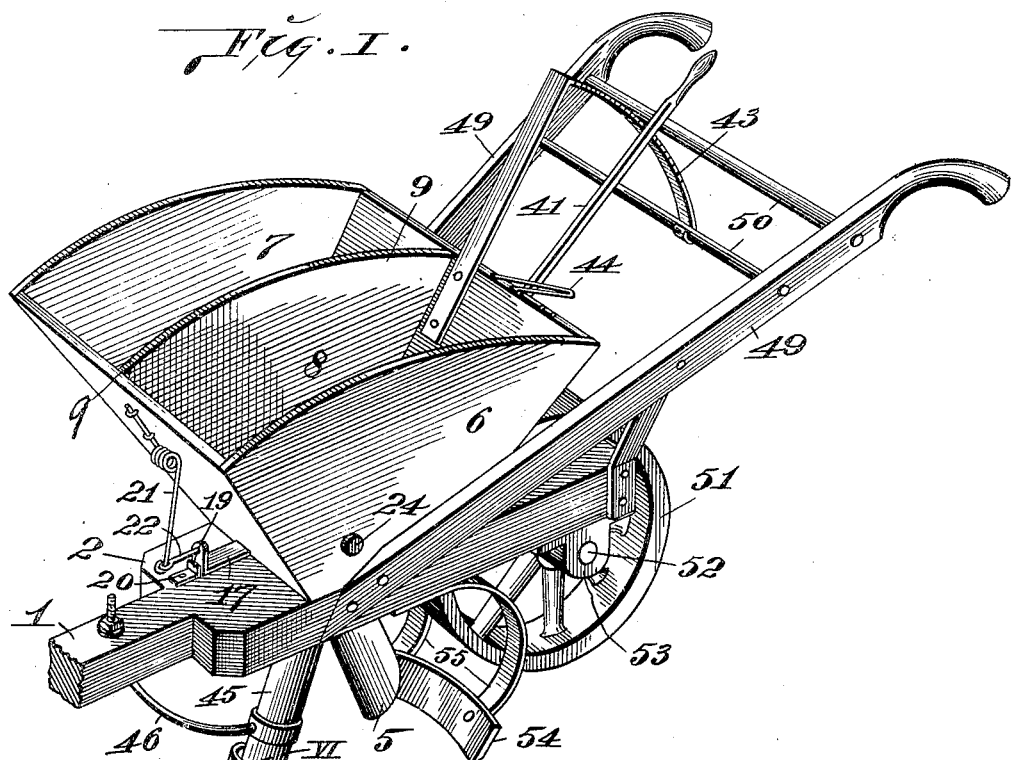
Fig. I.
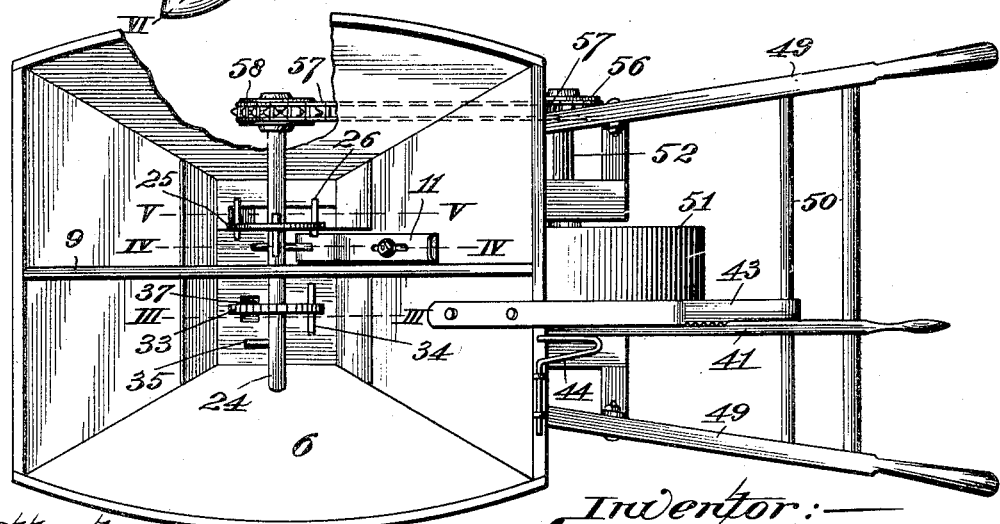
Fig. II.
Attest:
M. P. Smith
Blanche Hogan
Inventor:
F. S. Williams.
By Knight Bros.
Attys.

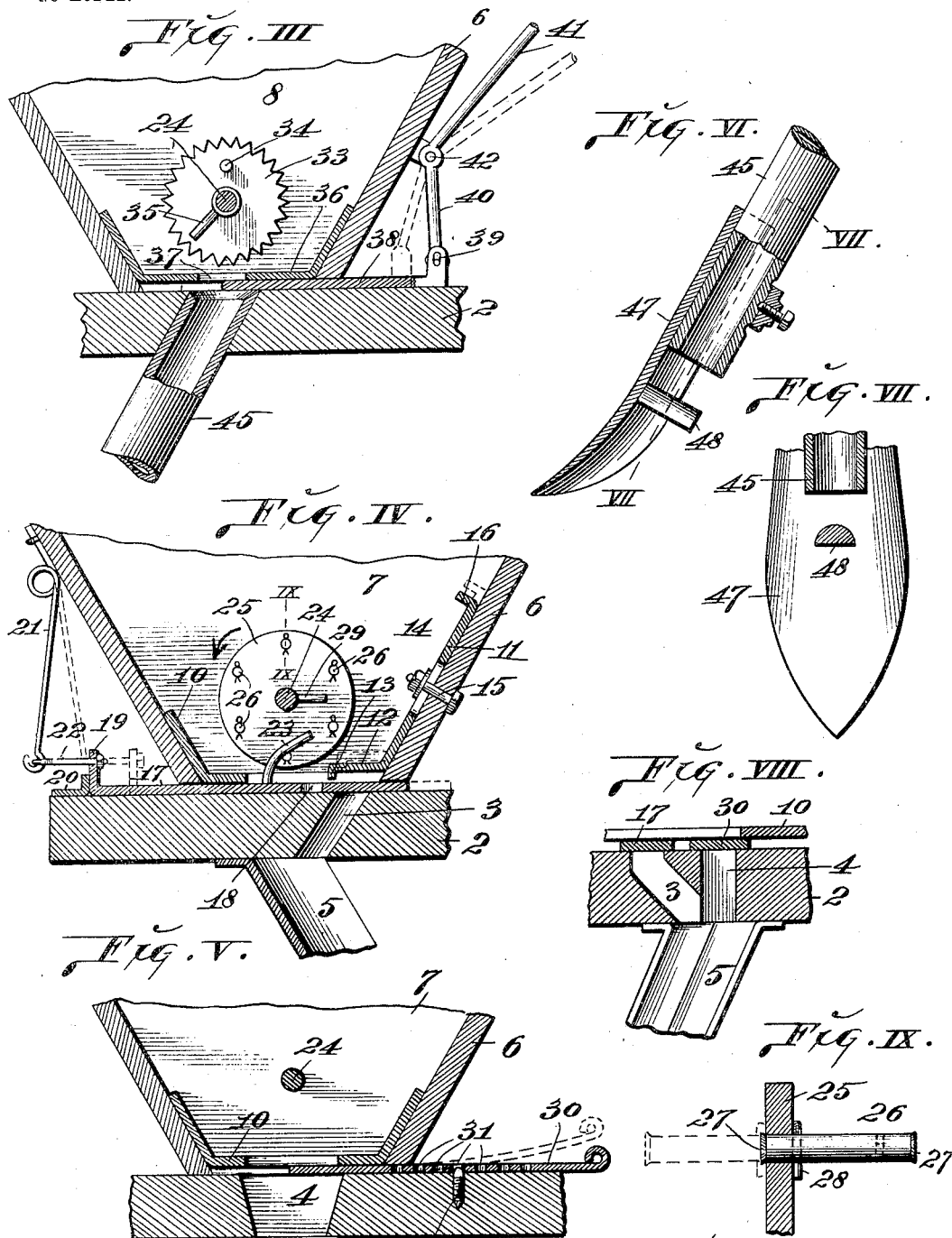

No. 770,515. Patented September 20, 1904.

UNITED STATES PATENT OFFICE.

FREDERIC S. WILLIAMS, OF ST. LOUIS, MISSOURI.

COMBINED COTTON-PLANTER AND FERTILIZER-DISTRIBUTER.

SPECIFICATION forming part of Letters Patent No. 770,515, dated September 20, 1904.

Application filed February 8, 1904. Serial No. 192,667. (No model.)

*To all whom it may concern:*

Be it known that I, FREDERIC S. WILLIAMS, a citizen of the United States, residing in the city of St. Louis, in the State of Missouri, have invented certain new and useful Improvements in a Combined Cotton-Planter and Fertilizer-Dropper, of which the following is a full, clear, and exact description, reference being had to the accompanying drawings, forming part of this specification.

My invention relates to an agricultural implement designed for use in making a seed-receiving furrow, dropping fertilizer in said furrow, and thereafter depositing the seed above the fertilizer, and means whereby the fertilizer and seed receiving furrow is closed after the planting is accomplished.

My invention consists in features of novelty hereinafter fully described, and pointed out in the claims.

Figure I is a perspective view of my implement. Fig. II is a top or plan view with the hopper of the implement partially broken out. Fig. III is an enlarged vertical longitudinal section taken on line III III, Fig. II. Fig. IV is an enlarged vertical longitudinal section taken on line IV IV, Fig. II. Fig. V is an enlarged vertical longitudinal section taken on line V V, Fig. II. Fig. VI is a view of the planter, furrow, shovel, and fertilizer-receiving spout, the parts being shown partially in vertical section, taken on line VI VI, Fig. II. Fig. VII is a vertical section taken on line VII VII, Fig. VI. Fig. VIII is a vertical cross-section taken on an irregular line through the hopper-bed of the planter, showing the grain-receiving ducts offset from each other therein. Fig. IX is an enlarged section taken on line IX IX, Fig. IV, through a portion of the seed-dropping valve-tripper disk.

1 designates the draft-beam of my planter, that is connected to a hopper-bed 2. In the hopper-bed are two seed-receiving ducts 3 and 4, that are offset from each other, the former of which is designed to receive seed dropped singly and the latter seed dropped in drilling action.

5 is a chute leading downwardly and rearwardly from the hopper-bed at the location of the seed-ducts 3 and 4 and through which the seed is conveyed toward furrows in the ground made by the shovel to be hereinafter mentioned.

6 designates a hopper that surmounts the bed 2 and which is divided into two compartments 7 and 8 by a partition 9. The compartment 7 is designed to receive the seed to be planted and the compartment 8 fertilizer.

10 is a forward guard fixed to the hopper in the compartment 7 and projecting rearwardly from the lower end of the hopper, and 11 is an adjustable guard that is provided with a forwardly-extending tongue 12, having a downturned lip 13, the members 12 and 13 being located slightly above the lower end or bottom of the hopper 6. The guard 11 is provided with a slot 14, that receives a set-bolt 15, which passes through the rear hopper wall and serves to uphold the guard at a desired elevation. At the upper end of the guard is a finger-piece 16.

17 designates a reciprocating slide-valve that is positioned beneath the compartment 7 of the hopper 6 and is provided with an orifice 18, that is adapted to be brought into registration with the seed-duct 3. The slide-valve 17 extends exterior of the hopper and is provided with an upturned arm 19, the outward movement of which is limited by a stop 20, mounted on the hopper-bed 2.

21 is a spring having one end secured to the forward wall of the hopper 6 and having its other end connected to the upturned arm 19 by a connecting-rod 22. (See Figs. I and IV.) Projecting upwardly from the slide-valve 17 within the hopper-compartment 7 is a finger 23, that is inclined rearwardly, as seen in Fig. IV.

24 designates a shaft mounted in the side walls and partition of the hopper 6 and extending transversely through both of the hopper-compartments. Fixed to the shaft 24 in the seed-compartment 7 is a tripper-disk 25.

26 designates a series of trip-pins that are loosely seated in the disk 25, so that they may be shifted longitudinally through the disk to either side thereof, as illustrated in Fig. IX. Each trip-pin is provided at its ends with heads 27, that prevent the escape of the pin, and the pins are held projected from either side of the tripper-disk by keys 28, that are removably inserted therein. When the trip-pins are projected through the tripper-disk to the side of said disk at which the slide-valve finger 23 is located, they are in a position to strike said finger during the rotation of the disk traveling in the direction indicated by the arrow in Fig. IV, thereby imparting movement to the finger and slide-valve to carry the orifice 18 in the valve to the seed-duct 3, after which actuation the valve is returned to its normal position by the spring 21. During this movement of the valve the seed that has not entered the valve-orifice to be conveyed to said duct is separated therefrom by the overhanging guard-tongue 12, which is positioned just above the valve, as seen in Fig. IV. The tongue 12 is of sufficient resilience to be sprung upward slightly by the seed in the valve-orifice if the seed is a large one and would in the absence of the resilient feature of the tongue fail to pass beneath it. The guard 11 may be adjusted vertically to suit the prevailing size of grains of seed being planted.

By the employment of a plurality of trip-pins 26 and mounting them shiftably longitudinally in the tripper-disk I provide for the actuation of the slide-valve 17 as frequently or as infrequently as it may desired to drop the seed to the ground. Where the seed is to be dropped less frequently than the employment of the total number of the trip-pins, any desired number of them may be shifted through the tripper-disk to extend therefrom only at the side of the tripper-disk opposite that occupied by the valve-finger 23, in which position they serve merely as agitators to keep the seed constantly stirred in the hopper.

29 is an agitator-finger projecting from the shaft 24 alongside of the tripper-disk and by which the seed is additionally stirred.

30 (see Fig. V) designates a slide-valve that controls the seed-duct 4 and which may be moved to uncover said duct to any desirable degree to permit drilling of the seed from the hopper-compartment 7 to the ground in lieu of dropping the seed singly, as provided for by the slide-valve 17. When the seed is being drilled, the slide-valve 17 is thrown out of service by disconnecting the spring 21 from it and removing the valve rearwardly, so that it will not be affected during the rotation of the tripper-disk. The slide-valve 30 is provided with a series of perforations 31 and is held in any position to which it is set by a pin 32, seated in the hopper-bed 2.

In the fertilizer-compartment 8 of the hopper fixed to the shaft 24 is an agitator-disk 33, that is preferably toothed, as illustrated in Figs. II and III, and bears fingers 34, by which the fertilizer is constantly stirred during the rotation of said disk.

35 is an agitator-finger carried by the shaft 24 and located adjacent to the disk 33.

36 is a bottom plate at the lower end of the hopper-compartment provided with a slot 37.

38 is a slide-valve that operates beneath the bottom plate 36 and serves to control the passage of fertilizer through the slot 37. This plate projects rearwardly from the lower end of the hopper 6 and is provided with ears 39, that receive the pivotal connection of an arm 40, carried by a hand-lever 41, that is pivoted to the hopper at 42. The hand-lever 41 engages a rack 43, by which it is held in any set position under the influence of a spring 44, carried by the rear hopper-wall, as seen in Figs. I and II.

45 designates a fertilizer-receiving spout the upper end of which is seated in the hopper-bed 2 immediately beneath the slot 37 in the hopper bottom 36. The spout 45 extends downwardly and forwardly, and it is connected to the beam-piece 1 of the planter by a stay 46.

47 is a furrow-opening shovel that is clamped to the lower end of the spout 45. At the rear side of this shovel beneath the lower end of said spout is a spreader 48, by which the fertilizer is deflected as it emerges from the spout, so that it will be distributed in a layer at the bottom of the furrow immediately after it is opened by the shovel 47.

49 designates the handles of the planter, which are connected by cross-rods 50, to one of which the rack 43 is connected, the opposite end of the rack being united to the hopper 6, as seen in Fig. I.

51 designates a ground-wheel the shaft 52 of which is journaled in bearing-boxes 53, fitted to the hopper-bed 2. The ground-wheel is located at the rear of the fertilizer-spout and seed-chute, and immediately in front of said wheel is a scraper 54, that is carried by arms 55, projecting downwardly from the hopper-bed 2, and preferably of spring form. On the ground-wheel shaft 52 is a sprocket-wheel 56, that receives a drive-chain 57, which leads to a sprocket-wheel 58 on the shaft 24, and through the medium of which the last-named shaft is rotated during the travel of the ground-wheel.

In the practical use of my implement the operation is as follows: As the implement is drawn over the ground the shovel 47 acts to produce a furrow and the ground-wheel 51 has rotation imparted to it due to contact with the ground, and motion is therefore imparted to the shaft 24 to rotate the tripper-disk in the seed-compartment and an agitator-disk in the fertilizer-compartment of the hopper 6 and actuate the seed-dropping mechanism associated therewith in the manner described. During this operation the fertilizer descends immediately in the rear of the shovel 47 to enter the furrow made thereby before any of the soil returns into the furrow, and consequently the small amount of soil that falls back into the furrow descends onto the fertilizer. The seed then falls onto the soil above the fertilizer, and immediately thereafter the furrow is closed by the scraper 54, which passes over the ground at the location where the seed has fallen.

I claim as my invention—

1. In an implement of the character described, the combination of a hopper, a tripper-disk rotatably mounted within said hopper, a valve for controlling the exit from said hopper, and trip-pins mounted in said tripper-disk, movable to extend from one side of the disk for engagement with said valve to impart movement thereto, and movable to extend from the other side of the disk, to agitate the material, substantially as set forth.

2. The combination with a hopper, of a tripper-disk rotatably mounted in the hopper, a valve for controlling the exit from said hopper, trip-pins provided with heads at each end, shiftable to extend from either side of the disk, and means for holding them in either position.

3. The combination with the hopper, of a horizontally-movable slide provided with an opening for controlling the exit from the hopper, a spring for holding the slide in one position, a rotary disk mounted in the hopper, pin movable to extend from either side of the disk, moving the slide when extending from one side and agitating the material when extending from the other side, and a vertically-adjustable guard for the slide.

FREDERIC S. WILLIAMS.

In presence of—
E. S. KNIGHT,
NELLIE V. ALEXANDER.